United States Patent
Ma et al.

(10) Patent No.: US 8,401,977 B2
(45) Date of Patent: *Mar. 19, 2013

(54) METHOD AND SYSTEM FOR CALCULATING IMPORTANCE OF A BLOCK WITHIN A DISPLAY PAGE

(75) Inventors: Wei-Ying Ma, Beijing (CN); Ji-Rong Wen, Beijing (CN); Ruihua Song, Beijing (CN); Haifeng Liu, Toronto (CA)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,579

(22) Filed: Jan. 10, 2012

(65) Prior Publication Data

US 2012/0109950 A1    May 3, 2012

Related U.S. Application Data

(63) Continuation of application No. 12/101,109, filed on Apr. 10, 2008, now Pat. No. 8,095,478, which is a continuation of application No. 10/834,639, filed on Apr. 29, 2004, now Pat. No. 7,363,279.

(51) Int. Cl.
  *G06F 17/00* (2006.01)
  *G06F 17/20* (2006.01)
(52) U.S. Cl. ................................................ 706/11
(58) Field of Classification Search .................. None
  See application file for complete search history.

(56) References Cited

U.S. PATENT DOCUMENTS

| | | | |
|---|---|---|---|
| 6,032,182 A * | 2/2000 | Mullen-Schultz | 709/223 |
| 6,067,565 A * | 5/2000 | Horvitz | 709/218 |
| 6,334,131 B2 * | 12/2001 | Chakrabarti et al. | 1/1 |
| 6,647,410 B1 | 11/2003 | Scimone et al. | |
| 6,700,590 B1 | 3/2004 | DeMesa et al. | |
| 6,701,350 B1 | 3/2004 | Mitchell | |
| 7,363,279 B2 | 4/2008 | Ma et al. | |
| 8,095,478 B2 | 1/2012 | Ma et al. | |
| 2001/0042016 A1 | 11/2001 | Muyres et al. | |
| 2002/0002488 A1 | 1/2002 | Muyres et al. | |
| 2002/0004744 A1 | 1/2002 | Muyres et al. | |

(Continued)

FOREIGN PATENT DOCUMENTS

| EP | 0 964 340 | 12/1999 |
|---|---|---|
| JP | 6130921 A | 5/1994 |

(Continued)

OTHER PUBLICATIONS

Bar-Yossef, Z. et al., "Template Detection via Data Mining and its Applications," ACM 1-58113-449-5/02/0005, Honolulu, Hawaii, May 7-11, 2002, pp. 580-591.

(Continued)

*Primary Examiner* — Kakali Chaki
*Assistant Examiner* — Peter Coughlan
(74) *Attorney, Agent, or Firm* — Perkins Coie LLP

(57) ABSTRACT

A method and system for identifying the importance of information areas of a display page. An importance system identifies information areas or blocks of a web page. A block of a web page represents an area of the web page that appears to relate to a similar topic. The importance system provides the characteristics or features of a block to an importance function that generates an indication of the importance of that block to its web page. The importance system "learns" the importance function by generating a model based on the features of blocks and the user-specified importance of those blocks. To learn the importance function, the importance system asks users to provide an indication of the importance of blocks of web pages in a collection of web pages.

20 Claims, 8 Drawing Sheets

U.S. PATENT DOCUMENTS

| | | | |
|---|---|---|---|
| 2002/0007379 | A1 | 1/2002 | Wang et al. |
| 2002/0062302 | A1 | 5/2002 | Oosta |
| 2002/0087221 | A1 | 7/2002 | Keeler et al. |
| 2002/0129011 | A1 | 9/2002 | Julien |
| 2003/0009547 | A1 | 1/2003 | Benfield et al. |
| 2003/0099395 | A1 | 5/2003 | Wang et al. |
| 2003/0110262 | A1 | 6/2003 | Hasan et al. |
| 2003/0115189 | A1 | 6/2003 | Srinivasa et al. |
| 2003/0128877 | A1 | 7/2003 | Nicponski |
| 2003/0130993 | A1 | 7/2003 | Mendelevitch et al. |
| 2003/0158855 | A1 | 8/2003 | Farnham |
| 2004/0024598 | A1 | 2/2004 | Srivastava et al. |
| 2004/0039848 | A1 | 2/2004 | Estrada et al. |
| 2004/0044747 | A1 | 3/2004 | Trevor et al. |
| 2004/0049374 | A1 | 3/2004 | Breslau et al. |
| 2004/0076345 | A1 | 4/2004 | Olszak et al. |

FOREIGN PATENT DOCUMENTS

| | | |
|---|---|---|
| JP | 2001014326 | 1/2001 |
| JP | 2004086849 | 3/2004 |

OTHER PUBLICATIONS

Cai, D. et al., "VIPS: a Vision-based Page Segmentation Algorithm," Technical Report MSR-TR-2003-79, Microsoft Corporation, Redmond, Washington, Nov. 1, 2003, pp. 1-29.

Cai, Deng et al., "Extracting Content Structure for Web Pages Based on Visual Representation," Springer-Verlag Berlin Heidelberg, APWeb 2003, LNCS 2642, Apr. 23-25, 2003, pp. 406-417.

European Search Report for European Application No. 05 10 3496, Sep. 19, 2005, 4 pages.

Kushmerick, N, "Learning to Remove Internet Advertisements," Proceedings of the Third Annual Conference on Autonomous Agents, Online!, May 1, 1999, pp. 175-181.

Lin, S. et al., "Discovering Informative Content Blocks from Web Documents," ACM 1-58113-567-X/02/0007, Edmonton, Alberta, Canada, Jul. 23-26, 2002, pp. 588-593.

Reid, E., "Web-Based Data Collection for the Analysis of Hidden Relationships (Web Mijning of Hypertext Links)," Proceedings of the 21st International Conference on Information Systems, Brisbane, Queensland, Australia, 2000, pp. 739-740.

Theeramunkong, T., "Passage-Based Web Text Mining," International Workshop on Information Retrieval with Asia Languages, Proceedings of the 5th International Workshop on Information Retrieval with Asian Languages, Hong Kong, China, 2000, pp. 205-206.

Yi, Lan et al., "Eliminating Noisy Information in Web Pages for Data Mining," ACM 1-58113-737-0/03/0008, Washington, D.C., Aug. 24-27, 2003, 10 pages.

Vi, Lan et al., "Eliminating Noisy Information in Web Pages for Data Mining," Association for Computing Machinery, Proceedings of the 9th ACM SIGKDD International Conference on Knowledge Discovery and Data Mining, Washington, DC, Aug. 24, 2003, pp. 296-305.

Yu, Shipeng et al., "Improving Pseudo-Relevance Feedback in Web Information Retrieval Using Web Page Segmentation," Proceedings of the 12th International Conference on World Wide Web, Budapest, Hungary, May 20, 2003, pp. 11-18.

* cited by examiner

METHOD AND SYSTEM FOR CALCULATING IMPORTANCE OF A BLOCK WITHIN A DISPLAY PAGE

CROSS REFERENCE TO RELATED APPLICATIONS

This application is a continuation application of U.S. patent application Ser. No. 12/101,109, filed on Apr. 10, 2008, issued as U.S. Pat. No. 8,095,478, which is a continuation of U.S. patent application Ser. No. 10/834,639, filed on Apr. 29, 2004, issued as U.S. Pat. No. 7,363,279, which are incorporated herein in their entirety by reference.

TECHNICAL FIELD

The described technology relates generally to identifying a block within a display page that represents the primary topic of the display page.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service then ranks the web pages of the search result based on the closeness of each match, web page popularity (e.g., Google's PageRank), and so on. The search engine service may also generate a relevance score to indicate how relevant the information of the web page may be to the search request. The search engine service then displays to the user links to those web pages in an order that is based on their rankings.

Whether the web pages of a search result are of interest to a user depends, in large part, on how well the keywords identified by the search engine service represent the primary topic of a web page. Because a web page may contain many different types of information, it may be difficult to discern the primary topic of a web page. For example, many web pages contain advertisements that are unrelated to the primary topic of the web page. A web page from a news web site may contain an article relating to an international political event and may contain "noise information" such as an advertisement for a popular diet, an area related to legal notices, and a navigation bar. It has been traditionally very difficult for a search engine service to identify what information on a web page is noise information and what information relates to the primary topic of the web page. As a result, a search engine service may select keywords based on noise information, rather than the primary topic of the web page. For example, a search engine service may map a web page that contains a diet advertisement to the keyword "diet," even though the primary topic of the web page relates to an international political event. When a user then submits a search request that includes the search term "diet," the search engine service may return the web page that contains the diet advertisement, which is unlikely to be of interest to the user.

It would be desirable to have a technique for calculating the importance of various information areas of a web page to the primary topic of the web page.

SUMMARY

An importance system identifies the importance of information areas of a display page. The importance system identifies information areas or blocks of a web page that represent areas of the web page that appear to relate to a similar topic. After identifying the blocks of a web page, the importance system provides the characteristics or features of a block to an importance function which generates an indication of the importance of that block to its web page. The importance system may learn the importance function by generating a model based on the features of blocks and the user-specified importance of those blocks.

DETAILED DESCRIPTION

Figure 1:
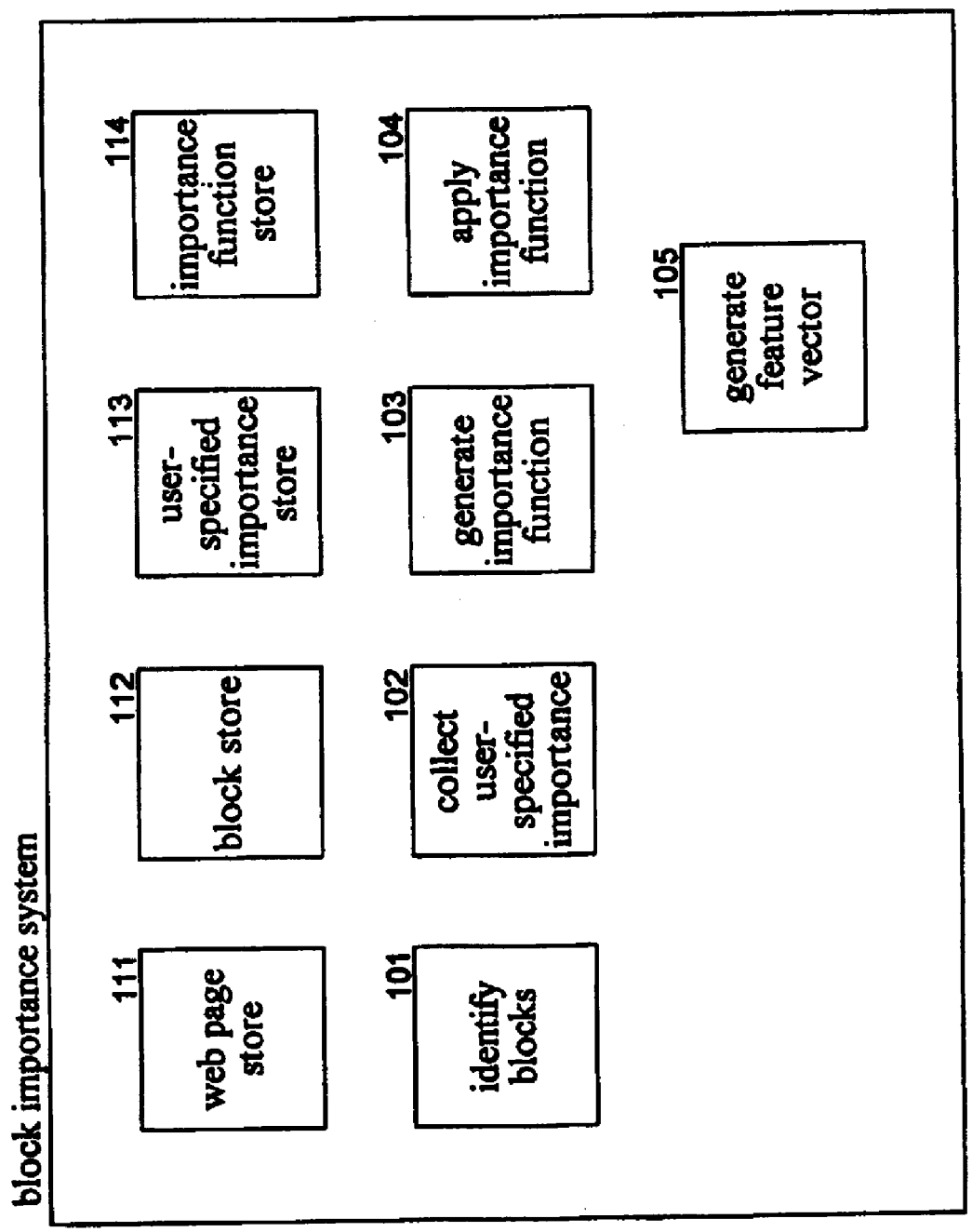
FIG. 1 is a block diagram that illustrates the components of the importance system in one embodiment.

A method and system for identifying the importance of information areas of a display page is provided. In one embodiment, an importance system identifies information areas or blocks of a web page. A block of a web page represents an area of the web page that appears to relate to a similar topic. For example, a news article of a web page may represent one block, and a diet advertisement of the web page may represent another block. After identifying the blocks of a web page, the importance system provides the characteristics or features of a block to an importance function that generates an indication of the importance of that block to its web page. The importance system "learns" the importance function by generating a model based on the features of blocks and the user-specified importance of those blocks. To learn the importance function, the importance system asks users to provide an indication of the importance of blocks of web pages in a collection of web pages. For example, one user may identify a certain block as of primary importance to a web page, and another user may identify that same block as of secondary importance to the web page. The importance system also identifies a feature vector for each block that may represent various spatial and content features of the block. For example, a spatial feature may be the size of a block or the location of a block, and a content feature may be the number of links within a block or the number of words within the block. The importance system then learns an importance function, based on the user-specified importance and the feature vectors of the blocks, that inputs a feature vector of a block and outputs the importance of the block. The importance system may attempt to learn a function that minimizes the square of the differences between the user-specified importance of the blocks and the importance calculated by the importance function. In this way, the importance system can identify a block of a web page that may be related to the primary topic of the web page based on features of blocks that users think are important.

The importance function, once learned, can be used to improve the accuracy of a wide range of applications whose results depend on discerning topics of web pages. A search engine service may use the importance function to calculate relevance of web pages of a search result to the search request. After the search result is obtained, the search engine service may use the importance function to identify the most important block of each web page and calculate a relevance of the most important block (or group of importance blocks) to the search request. Because this relevance is based on the information of the most important block of the web page, it may be a more accurate measure of relevance than a relevance that is based on the overall information of the web page, which may include noise information.

A search engine service may also use the importance function to identify web pages that are related to a certain web page. The search engine service may use the importance function to identify the most important block of that web page and then formulate a search request based on the text of the identified block. The search engine service may perform a search using that formulated search request to identify web pages that are related to that certain web page.

A search engine service may also use the importance function to classify web pages. For example, web pages may be classified based on their primary topic. The search engine service may use the importance function to identify the most important block of a web page and then classify the web page based on the text of the identified block.

A web browser may also use the importance function to identify portions of a web page to be displayed when the entire content of the web page cannot fit on a display device. For example, devices such as cell phones or personal digital assistants may have very small displays on which most web pages cannot reasonably be displayed because of the amount, size, and complexity of the information of the web page. A web page is not reasonably displayed when the content is so small that it cannot be effectively viewed by a person. When such a device is used to browse web pages, the importance function may be used to identify a most important block of a web page and to display only the identified block on the small display. Alternatively, a web browser may rearrange the blocks of a web page, highlight blocks of a web page, remove blocks of a web page, and so on based on the importance of the blocks as indicated by the importance function.

The importance system can identify the information areas of a web page using various segmentation techniques such as a document object model based ("DOM-based") segmentation algorithm, a location-based segmentation algorithm, a vision-based segmentation algorithm, and so on. A DOM-based segmentation algorithm may use the HTML hierarchy of a web page to identify its various blocks. A location-based segmentation algorithm attempts to identify areas of a web page that may be considered a unit based on physical characteristics of the areas. A vision-based segmentation algorithm is described in U.S. patent application Ser. No. 10/628,766, entitled "Vision-Based Document Segmentation," filed on Jul. 28, 2003, which is hereby incorporated by reference. That vision-based segmentation algorithm identifies blocks based on the coherency of the information content of each block. For example, an advertisement for a diet may represent a single block because its content is a directed to a single topic and thus has a high coherency. An area of a display page that includes many different topics may be divided into many different blocks.

The importance system may use various techniques to learn the importance function from the feature vectors representing the blocks and the user-specified importance of the blocks. For example, as described below in more detail, the importance system may learn the importance function using a neural network or a support vector machine. In addition, the importance system may use various spatial and content features of a block in a feature vector representation of the block. For example, the spatial features may include the center location of the block and the dimensions of the block, which are referred to as "absolute spatial features." These absolute spatial features may be normalized based on the size of the web page, which are referred to as "relative spatial features," or normalized based on the size of the window, which are referred to as "window spatial features." The content features may relate to the images of the block (e.g., number and size of images), links of the block (e.g., the number of links and the number of words in each link), text of the block (e.g., number of words in block), user interaction of the block (e.g., number and size of input fields), and forms of the block (e.g., number and size). Various content features may also be normalized. For example, the number of links of a block may be normalized by the total number of links on the web page, or the number of words of text in the block may be normalized by the total number of words in the text of all the blocks of the web page.

In one embodiment, the importance system may allow users to specify the importance of blocks using discrete or continuous values. Higher values may represent a higher importance of a block to a web page. When using discrete values of 1-4, a value of 1 may represent noise information such as an advertisement, a copyright notice, a decoration, and so on. A value of 2 may represent useful information that is not particularly relevant to the primary topic of the page such as navigation information, directory information, and so on. A value of 3 may represent information that is relevant to the primary topic of the page but not of prominent importance such as related topics, topic indexes, and so on. A value of 4 may indicate the most prominent part of the web pages such as a headline, main content, and so on.

FIG. 1 is a block diagram that illustrates the components of the importance system in one embodiment. The importance system may include the components 101-105 and data stores 111-114. The components may include an identify blocks component 101, a collect user-specified importance component 102, a generate importance function component 103, an apply importance function component 104, and a generate feature vector component 105. The data stores may include a web page store 111, a block store 112, a user-specified importance store 113, and an importance function store 114. The web page store may contain a collection of web pages for use in generating or learning the importance function. The identify blocks component identifies the blocks of each web page of the web page store and stores the identification of each block in the block store. The collect user-specified importance component displays each web page of the web page store to a user highlighting each of the blocks of the web page, asks the user to specify the importance of each block, and stores the specifications of importance in the user-specified importance store. The generate importance function component uses the generate feature vector component to generate a feature vector for each block of the block store. The generate importance function then learns an importance function to model the feature vectors of the blocks and the user-specified importance of the blocks. The importance function store may contain information such as factors and parameters that define the learned importance function that are calculated by the generate importance function component. The apply importance function component is passed a block of a web page, invokes the generate feature vector component to generate the feature vector for the block, and applies the importance function to the generated feature vector to generate an indication of the importance of the block.

The computing device on which the importance system can be implemented may include a central processing unit, memory, input devices (e.g., keyboard and pointing devices), output devices (e.g., display devices), and storage devices (e.g., disk drives). The memory and storage devices are computer-readable media that may contain instructions that implement the importance system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the importance system may be implemented. The operating environment is only one example of a suitable operating environment and is not intended to suggest any limitation as to the scope of use or functionality of the importance system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The importance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In one embodiment, the importance system learns a block importance function by minimizing a least squares objective function based on user-specified importance of blocks of a collection of web pages. Each block can be represented by a feature vector and importance pair (x, y) where x is the feature vector of the block and y is its importance. The set of feature vector and importance pairs of the collection of web pages is referred to as a training set T. The importance system attempts to learn an importance function $f$ that minimizes the following objective function:

$$\Sigma_{(x,y) \in T} |f(x) - y|^2 \tag{1}$$

The objective function can be solved using classification techniques such as a support vector machine if y is discrete and regression techniques such as a neural network if y is continuous.

When the importance is represented by continuous real numbers, the importance system may apply a neural network learning for learning the optimal $f^*$ which is given by minimizing the following objective function:

$$f^* = \underset{f}{\operatorname{argmin}} \sum_{i=1}^{m} \|f(x_i) - y_i\|^2 \tag{2}$$

where m is the number of blocks in the training set. This is a multivariate non-parametric regression problem, since there is no a priori knowledge about the form of the true regression function that is being estimated.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the importance system uses a radial basis function ("RBF") network and a standard gradient descent as the search technique.

The importance system constructs an RBF network with three layers having different roles. The input layer comprises source nodes (i.e., sensory units) that connect the network to its environment (i.e., low-level feature space). The hidden layer applies a nonlinear transformation from the input space to the hidden space. Generally, the hidden space is of high dimensionality. The hidden layer has RBF neurons, which calculate the input of the hidden layer by combining weighted inputs and biases. The output layer is linear and supplies the block importance given the low-level block representation applied to the input layer.

The function learned by RBF networks can be represented by the following:

$$f_i(x) = \sum_{j=1}^{h} \omega_{ij} G_i(x) \tag{3}$$

where i is a block in the training set, h is the number of hidden layer neurons, $\overline{\omega}_{ij} \in R$ are the weights, and $G_i$ is the radial function defined as follows:

$$G_i(x) = \exp\left(-\frac{\|x - c_i\|^2}{\sigma_i^2}\right) \tag{4}$$

where $c_i$ is the center for $G_i$ and $\sigma_i$ is the basis function width. The k-dimensional mapping can be represented as follows:

$$x \to f(x) = (f_1(x), f_2(x), \ldots, f_k(x)) \tag{5}$$

where $f = [f_1, f_2, \ldots, f_k]$ is the mapping function.

The RBF neural network approximates the optimal regression function from feature space to block importance. The importance system can train the RBF neural network off-line with the training samples $\{x_i, y_i\}$ (i=1, ..., m) of the training set T. For a new block previously unprocessed, the importance system can calculate its importance using the regression function $f$ given the feature vector of the block.

When the importance is represented by discrete numbers, the importance system applies a support vector machine for learning the importance function. A support vector machine attempts to minimize structural risk, rather than empirical risk. The support vector machine may use a binary classification such that the training set is defined by the following:

$$D=\{x_i,y_i\}_{i=1}^{t} \quad (6)$$

where D is the training set, t is the number of training samples, and $y_i \in \{-1,1\}$. The importance system attempts to select, among the infinite number of linear classifiers that separate the data, the one with the minimum generalization error. A hyperplane with this property is the one that leaves the maximum margin between the two classes. The importance function may be represented by the following:

$$f(x) = \operatorname{sign}\left(\sum_{i=1}^{t} \alpha_i y_1 \langle x_i, x \rangle - b\right) \quad (7)$$

where $\alpha_i$ associated with the training sample $x_i$ expresses the strength with which that point is embedded in the final function and b is the intercept also known as the bias in machine learning. A property of this representation is that often only a subset of the points will be associated with non-zero $\alpha_i$. These points are called support vectors and are the points that lie closest to the separating hyperplane. The nonlinear support vector machine maps the input variable into a high dimensional (often infinite dimensional) space, and applies the linear support vector machine in the space. Computationally, this can be achieved by the application of a (reproducing) kernel. The corresponding nonlinear decision function is represented as follows:

$$f(x) = \operatorname{sign}\left(\sum_{i=1}^{t} \alpha_i y_1 K(x_i, x) - b\right) \quad (8)$$

where K is the kernel function. Some typical kernel functions include a polynomial kernel, Gaussian RBF kernel, and sigmoid kernel. For a multi-class classification problem, the importance system can apply a one-against-all scheme.

Figure 2:
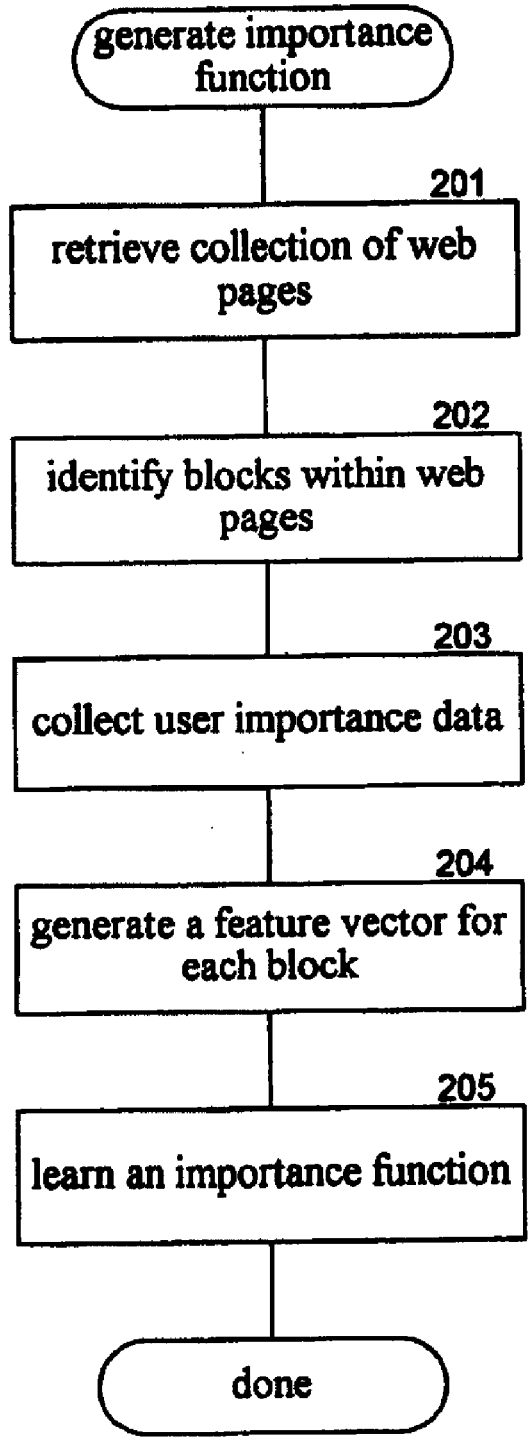
FIG. 2 is a flow diagram that illustrates the processing of a generate importance function component of the importance system in one embodiment.

FIG. 2 is a flow diagram that illustrates the processing of a generate importance function component of the importance system in one embodiment. In block 201, the component retrieves the collection of web pages from the web page store. In block 202, the component identifies the blocks within the retrieved web pages and stores the indications of the blocks in the block store. In block 203, the component collects user-specified importance data for the blocks. The component may display each web page along with an indication of the blocks of the web page and ask a user to rate the importance of each block to the web page. The component stores the user-specified importance in the user-specified importance store. In block 204, the component generates a feature vector for each block and may store the feature vectors in the block store. In block 205, the component learns the importance function using a neural network or a support vector machine technique as described above.

Figure 3:
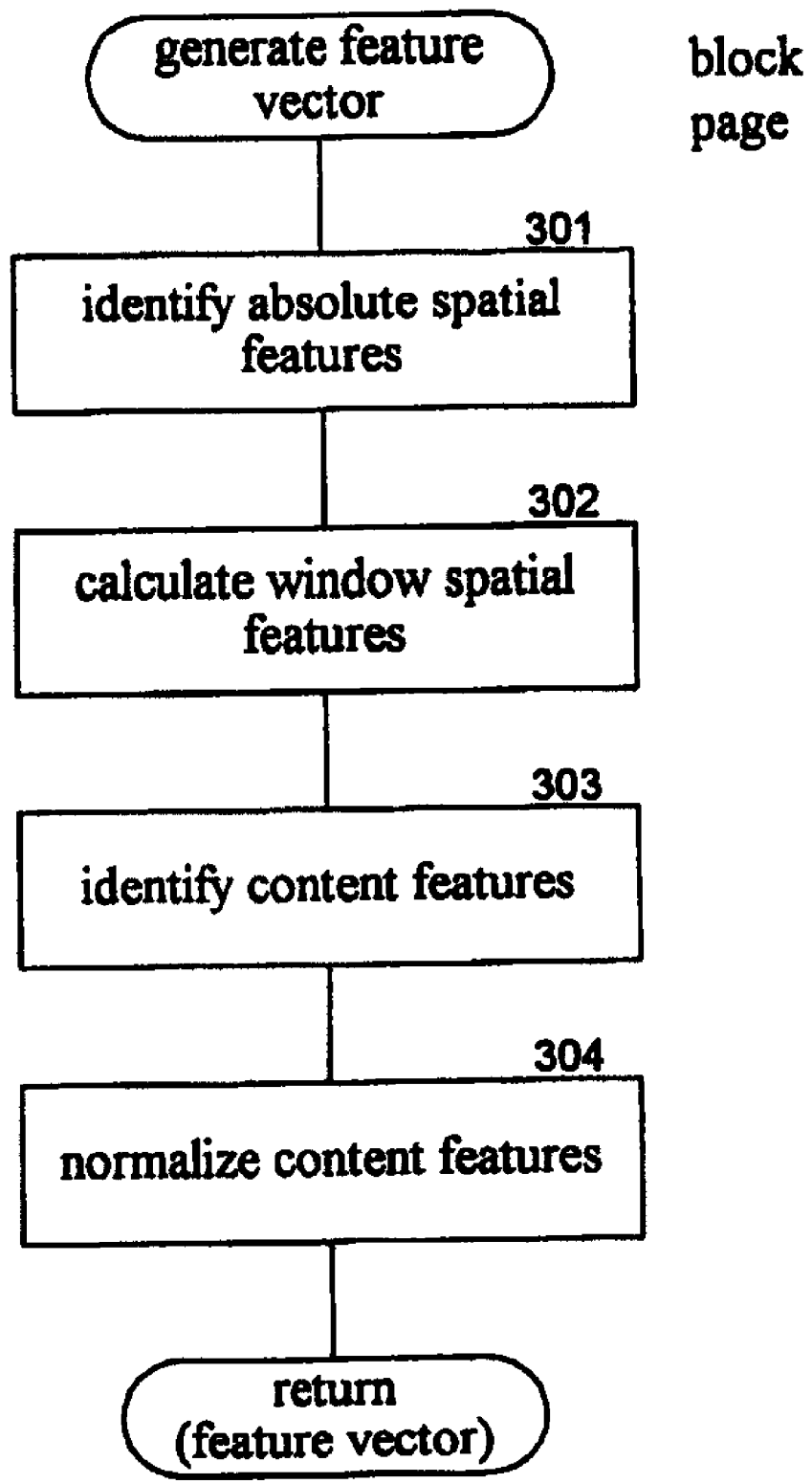
FIG. 3 is a flow diagram that illustrates the processing of a generate feature vector component of the importance system in one embodiment.

FIG. 3 is a flow diagram that illustrates the processing of a generate feature vector component of the importance system in one embodiment. The component is passed an indication of a web page along with an indication of a block of the web page whose importance is to be calculated. In block 301, the component identifies the absolute spatial features of the block. In block 302, the component calculates the window spatial features of the block. The component may calculate the window spatial features such as block center for the y-coordinate according to the following:

$$BlockCenterY = \begin{cases} BlockCenterY / (2 * HeaderHeight); \\ \quad \text{if } BlockCenterY < HeaderHeight \\ 0.5; \quad \text{if } HeaderHeight < BlockCenter \\ \quad Y < PageHeight - FooterHeight \\ 1 - (PageHeight - BlockCenterY) / (2 * FooterHeight) \\ \quad \text{otherwise}; \end{cases} \quad (9)$$

where HeaderHeight and FooterHeight are predefined constant values relating to the heights of headers and footers of a page. In block 303, the component identifies the content features of the block. In block 304, the component normalizes the content features as appropriate and then returns the feature vector.

Figure 4:
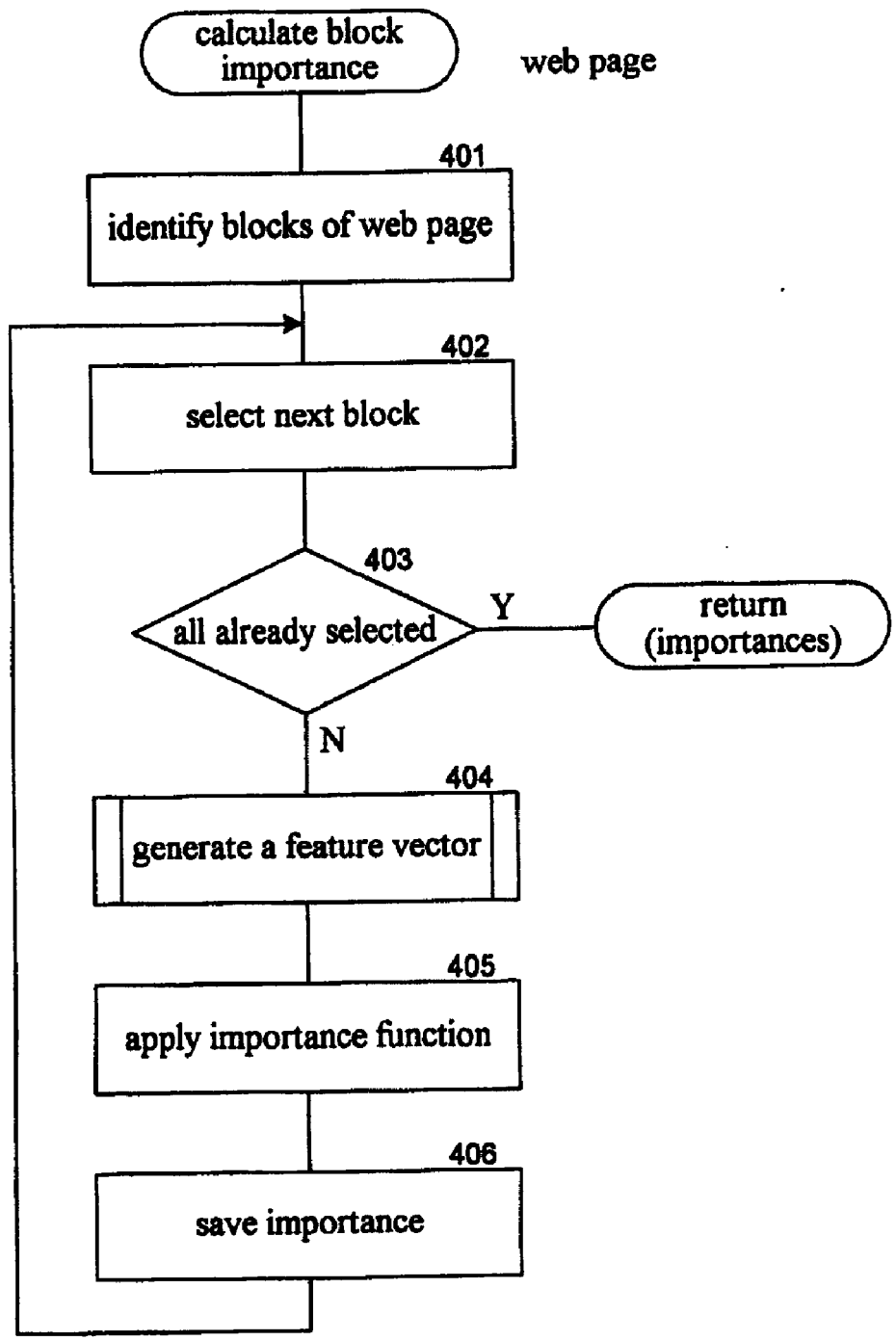
FIG. 4 is a flow diagram that illustrates the processing of a calculate block importance component of the importance system in one embodiment.

FIG. 4 is a flow diagram that illustrates the processing of a calculate block importance component of the importance system in one embodiment. The component is passed an indication of a web page and calculates the importance of each block of the web page by applying the learned importance function. In block 401, the component identifies the blocks of the passed web page. In blocks 402-406, the component loops calculating the importance of each block of the passed web page. In block 402, the component selects the next block of the passed web page. In decision block 403, if all the blocks of the passed web page have already been selected, then the component returns the importance of each block, else the component continues at block 404. In block 404, the component invokes the generate feature vector component to generate the feature vector for the selected block. In block 405, the component applies the learned importance function to the generated feature vector to calculate the importance of the selected block. In block 406, the component saves the calculated importance and then loops to block 402 to select the next block of the passed web page.

Figure 5:
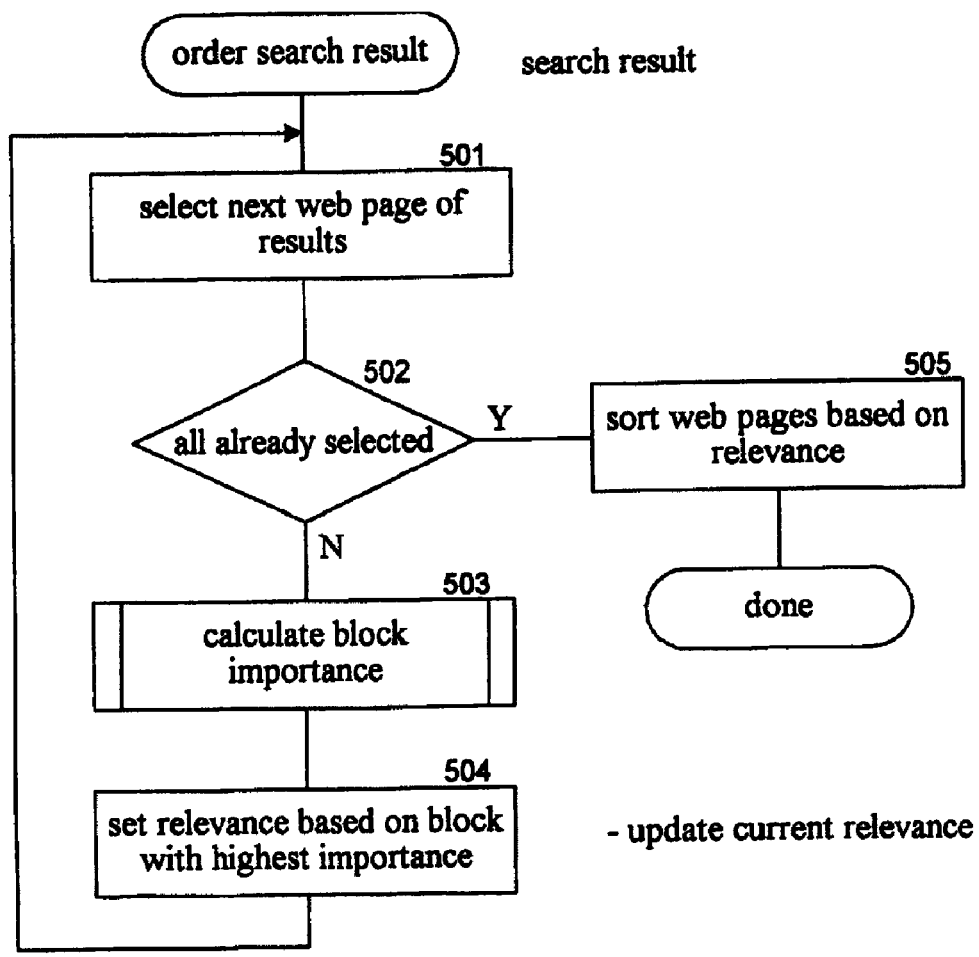
FIG. 5 is a flow diagram that illustrates the processing of an order search result component that uses the learned importance function in one embodiment.

FIGS. 5-8 illustrate the use of the learned importance function in various applications. FIG. 5 is a flow diagram that illustrates the processing of an order search result component that uses the learned importance function in one embodiment. The component is passed a search result of web pages and returns the search result reordered based on block importance as calculated by the learned importance function. In block 501, the component selects the next web page of the search result. In decision block 502, if all the web pages of the search result have already been selected, then the component continues at block 505, else the component continues at block 503. In block 503, the component invokes a calculate block importance component to calculate the importance of each block of the selected web page. In block 504, the component sets the relevance of the web page based on the block with the highest importance. The component may calculate the relevance based on how well the text of the most important block (or blocks) matches the search request for which the search result was identified. The component may also combine that relevance with the relevance of each web page that was calculated by a search engine. The component then loops to block 501 to select the next web page of the search result. In block 505, the component sorts the web pages based on the set relevance and then returns the reordered web pages of the search result.

Figure 6:
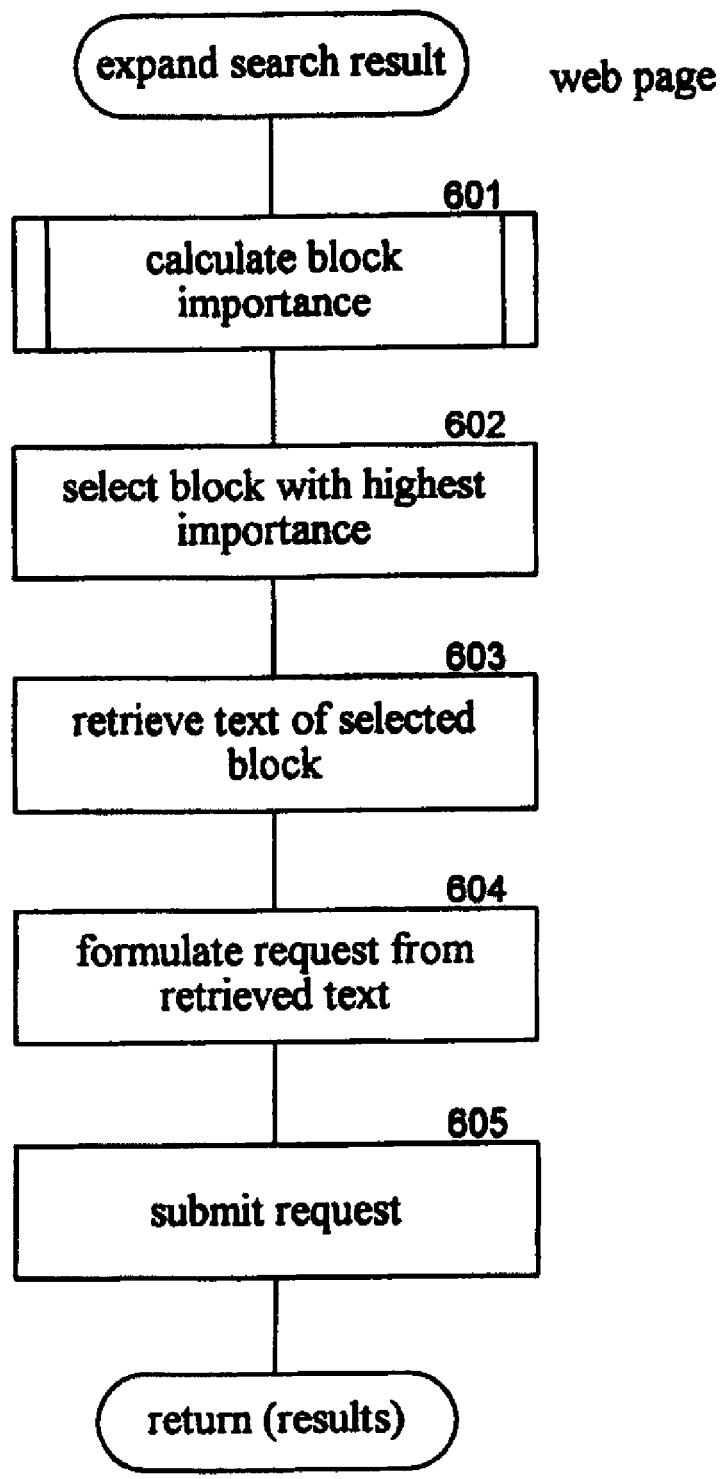
FIG. 6 is a flow diagram that illustrates the processing of an expand search result component that uses the learned importance function in one embodiment.

FIG. 6 is a flow diagram that illustrates the processing of an expand search result component that uses the learned importance function in one embodiment. The component is passed a web page and identifies web pages that may be related to the passed web page. In block 601, the component invokes the calculate block importance component to calculate the importance of each block of the passed web page. In block 602, the component selects the block of the passed web page with the highest importance. In block 603, the component retrieves the text associated with the selected block. In block 604, the component formulates a search request based on the retrieved text. In block 605, the component submits the formulated search request to a search engine service and receives the search result in return. The component then returns the search result.

Figure 7:
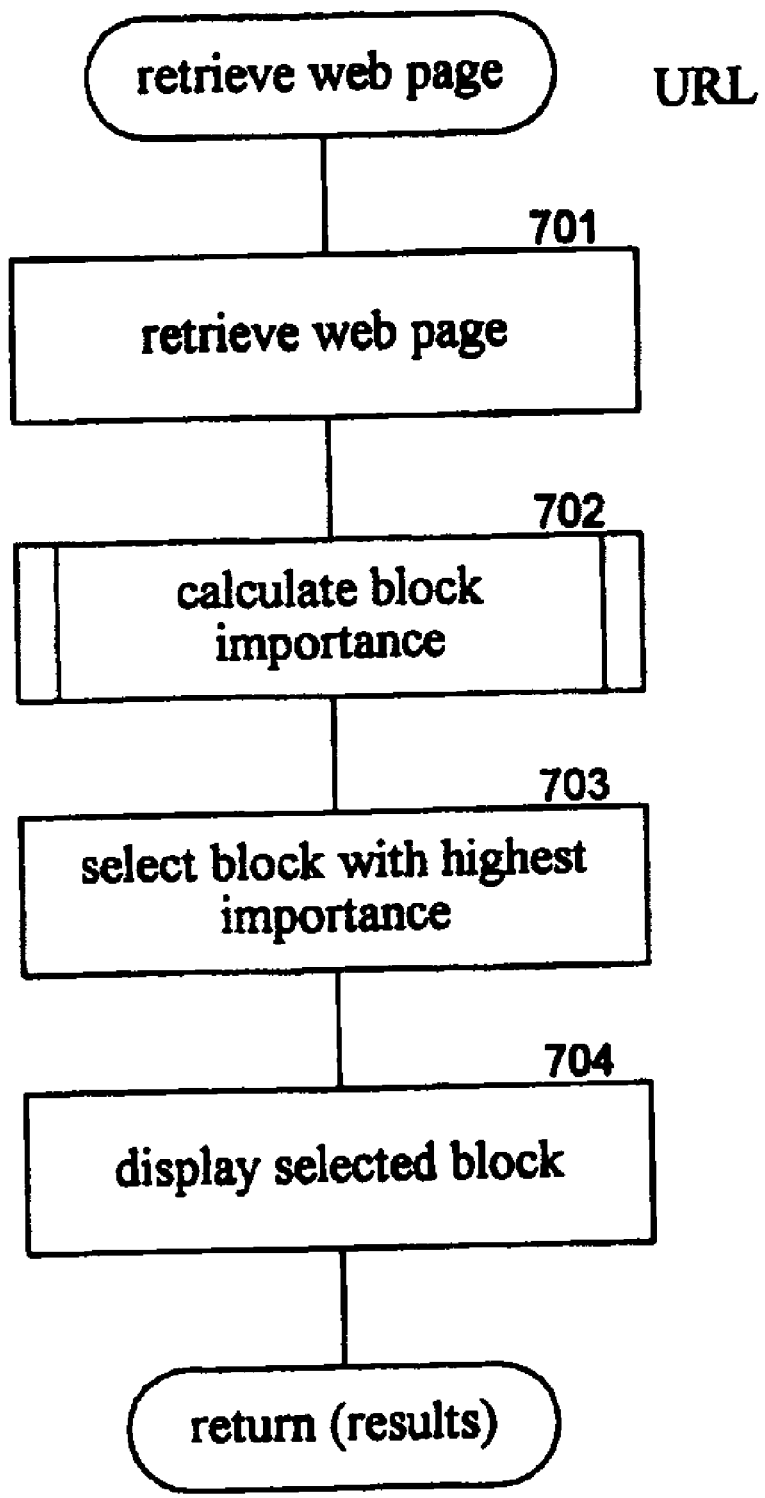
FIG. 7 is a flow diagram that illustrates the processing of a retrieve web page component that uses the learned importance function in one embodiment.

FIG. 7 is a flow diagram that illustrates the processing of a display web page component that uses the learned importance function in one embodiment. This component is passed a uniform resource locator of a web page and displays the content of the block of that web page with the highest importance as the content of the web page itself. In block 701, the component uses the passed uniform resource locator to retrieve the web page. In block 702, the component invokes the calculate block importance function to calculate the importance of each block of the retrieved web page. In block 703, the component selects the block of the retrieved web page with the highest importance. In block 704, the component displays the selected block as the content of the web page.

Figure 8:
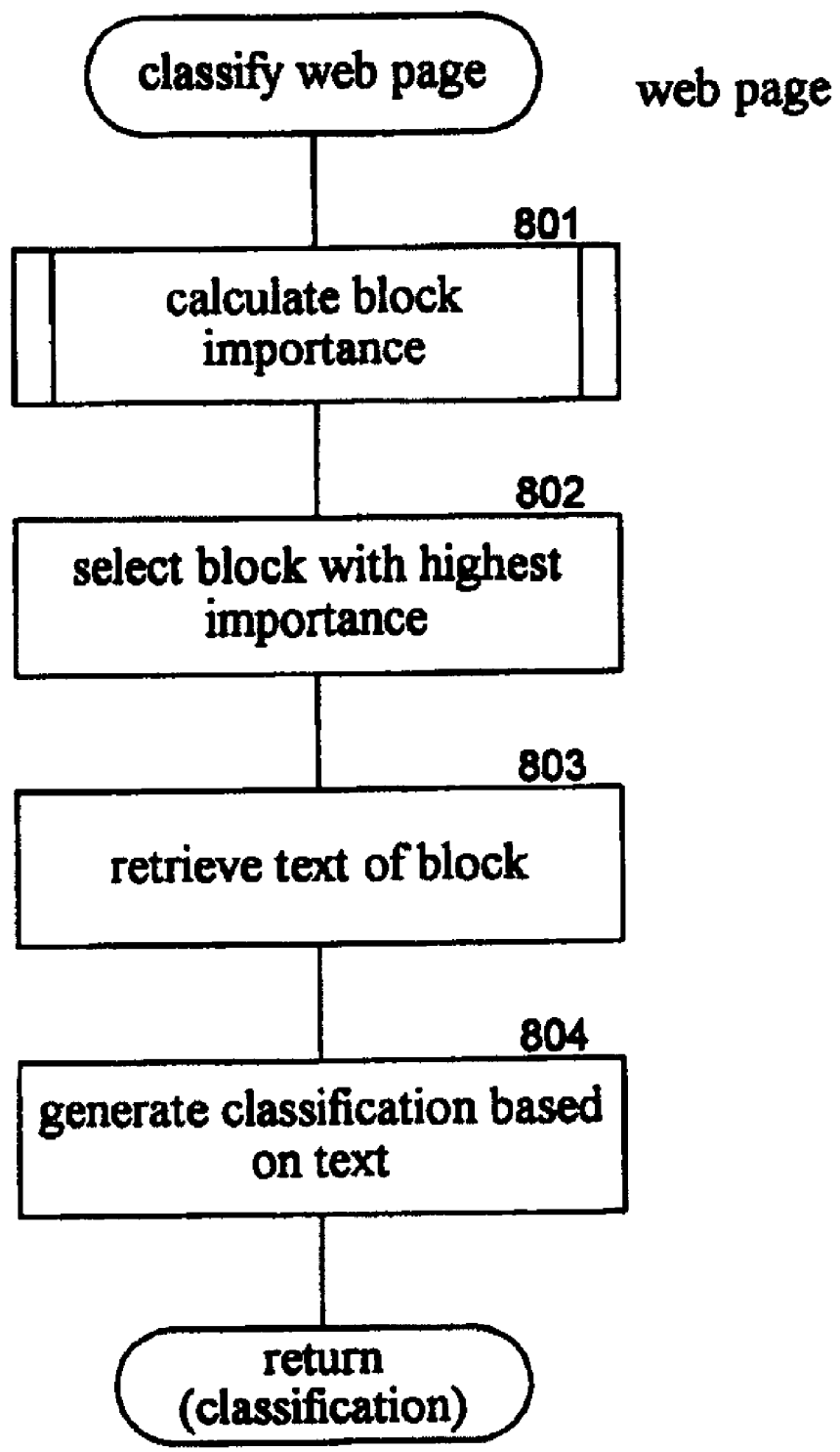
FIG. 8 is a flow diagram that illustrates the processing of a classify web page component that uses the learned importance function in one embodiment.

FIG. 8 is a flow diagram that illustrates the processing of a classify web page component that uses the learned importance function in one embodiment. The component is passed a web page and classifies that web page. In block 801, the component invokes the block importance function to calculate the importance of each block of the passed web page. In block 802, the component selects the block (or group of blocks) of the passed web page with the highest importance. In block 803, the component retrieves the text of the selected block with the highest importance. In block 804, the component generates a classification based on the retrieved text. The classification may also be based on links within the selected block. The component then returns the classification.

One skilled in the art will appreciate that although specific embodiments of the importance system have been described herein for purposes of illustration, various modifications may be made without deviating from the spirit and scope of the invention. The principles of the importance system may be used to determine the importance of information areas within various information sources other than web pages. These information sources may include documents represented using HTML, XML, or other markup languages. One skilled in the art will appreciate that some applications of block importance may use an importance function that is not "learned." For example, a developer can simply define an importance function that reflects their concept of block importance and not rely on collecting empirical data of user ratings of block importance. Such an importance function could rate the importance of a block based on a combination of its size and location. Accordingly, the invention is not limited except by the appended claims.

The invention claimed is:

1. A computer-readable storage device storing computer-executable instructions for controlling a computing device to establish relevance of pages of search results, by a method comprising:
for each of a plurality of pages,
identifying blocks of the page; and
determining importance to the page of each identified block of the page;
receiving a search request;
identifying pages related to the search request as search results of the search request; and
for the identified pages of the search results, determining relevance of the identified page to the search request based on the block of the identified page with the highest importance; and
ranking the pages of the search results based on the determined relevance of the identified pages.

2. The computer-readable storage device of claim 1 wherein the determining of relevance includes adjusting a previously calculated relevance.

3. The computer-readable storage device of claim 1 wherein the determining of importance of each identified block includes generating a feature vector for the identified block and applying an importance function to the generated feature vector.

4. The computer-readable storage device of claim 3 wherein the importance function is learned based on user-specified importance for blocks of a collection of pages.

5. The computer-readable storage device of claim 3 wherein the feature vector includes a spatial feature.

6. The computer-readable storage device of claim 3 wherein the feature vector includes a content feature.

7. The computer-readable storage device of claim 1 wherein the identifying of the blocks of the page is performed after the identifying of pages related to the search request.

8. A computing device for establishing relevance of pages of search results, comprising:
a memory storing computer-executable instructions of:
a component that identifies blocks of a page;
a component that determines importance to a page of each identified block of the page;
a component that identifies pages related to a search request as search results of the search request;
a component that determines relevance of an identified page to the search request based on the block of the identified page with the highest importance; and
a component that ranks the pages of the search results based on the determined relevance of the identified pages; and
a processor that executes the computer-executable instructions stored in the memory.

9. The computing device of claim 8 wherein the component that determines relevance adjusts a previously calculated relevance.

10. The computing device of claim 8 wherein the component that determines importance of each identified block generates a feature vector for the identified block and applies an importance function to the generated feature vector.

11. The computing device of claim 10 wherein the importance function is learned based on user-specified importance for blocks of a collection of pages.

12. The computing device of claim 8 wherein the component that identifies blocks of the page is invoked after the component that identifies pages related to the search request.

13. A computer-readable storage device, that is not a signal, storing computer-executable instructions for controlling a computing device to select a portion of a page for display on a display device, by a method comprising:
for each of a plurality of pages,
identifying blocks of the page; and
determining importance to the page of each identified block of the page; receiving a request to display a page; and in response to receiving the request to display the page, selecting the block of the page with the highest determined importance; and providing the selected block for display on the display device without providing the entire content of the page for display on the display device.

14. The computer-readable storage device of claim 13 wherein the determining of importance of each identified block includes generating a feature vector for the identified block and applying an importance function to the generated feature vector.

15. The computer-readable storage device of claim 14 wherein the importance function is learned based on user-specified importance for blocks of a collection of pages.

16. The computer-readable storage device of claim 13 wherein the identifying of the blocks of the page is performed after the request is received.

17. The computer-readable storage device of claim 13 including determining whether the entire content can fit on the display device and wherein upon determining that the entire content cannot fit on the display device, the block of the page with the highest determined importance is selected.

18. A computing device that selects a portion of a page for display on a display device, comprising:
a memory storing computer-executable instructions of:
a component that identifies blocks of a page;
a component that determines importance to a page of each identified block of the page;
a component that receives a request to display a requested page;
a component that selects the block of the requested page with the highest determined importance; and
a component that provides the selected block for display on the display device without providing the entire content of the requested page for display on the display device; and
a processor that executes the computer-executable instructions stored in the memory.

19. The computing device of claim 18 wherein the component that determines importance of each identified block generates a feature vector for the identified block and applies an importance function to the generated feature vector.

20. The computing device of claim 19 wherein the importance function is learned based on user-specified importance for blocks of a collection of pages.

* * * * *